W. A. WINTER AND L. DAY.
STERILIZABLE CAUTERY.
APPLICATION FILED SEPT. 8, 1917.
1,366,281.
Patented Jan. 18, 1921.
3 SHEETS—SHEET 3.
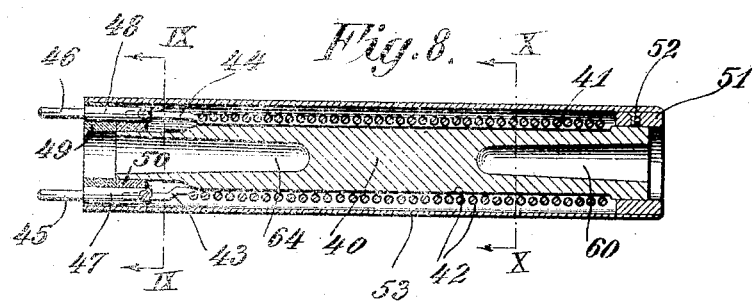
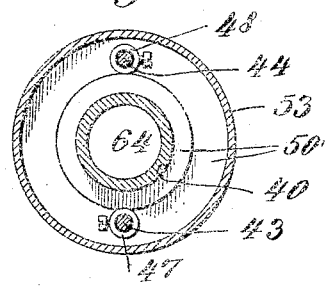
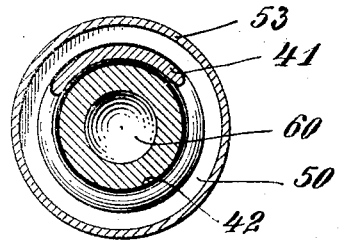
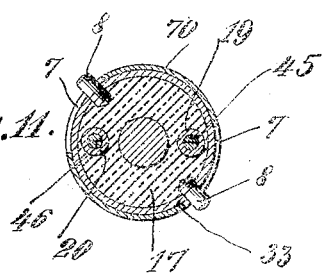
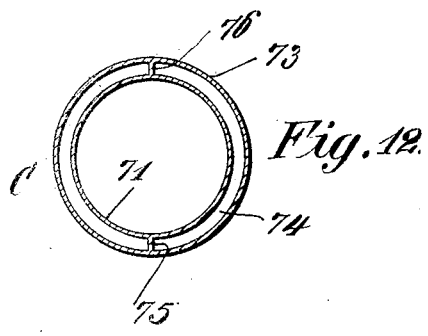
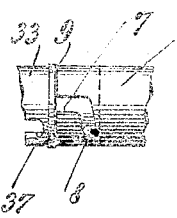
Inventors
William A. Winter
and Leonard Day
By their Attorney

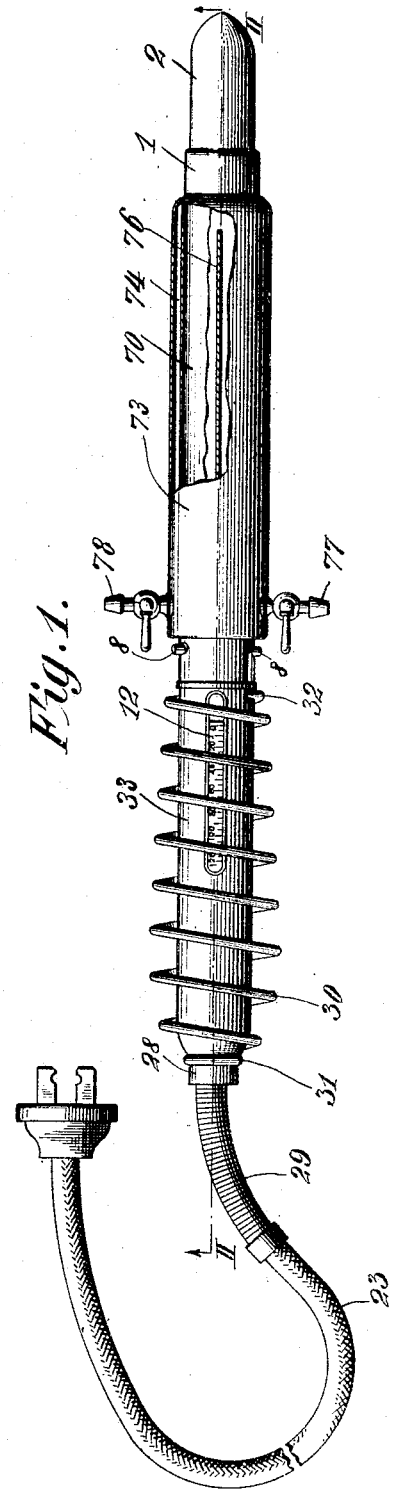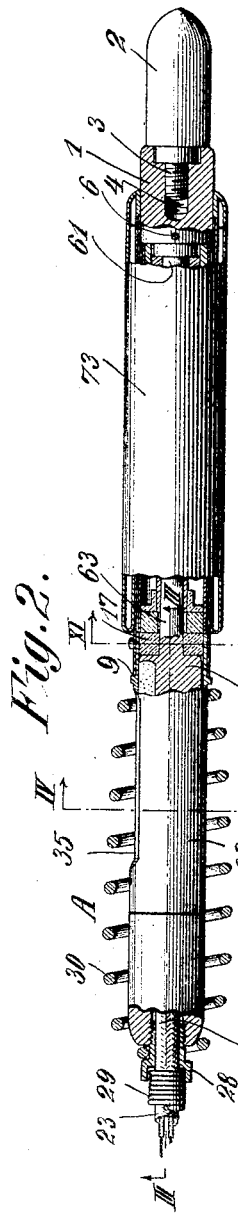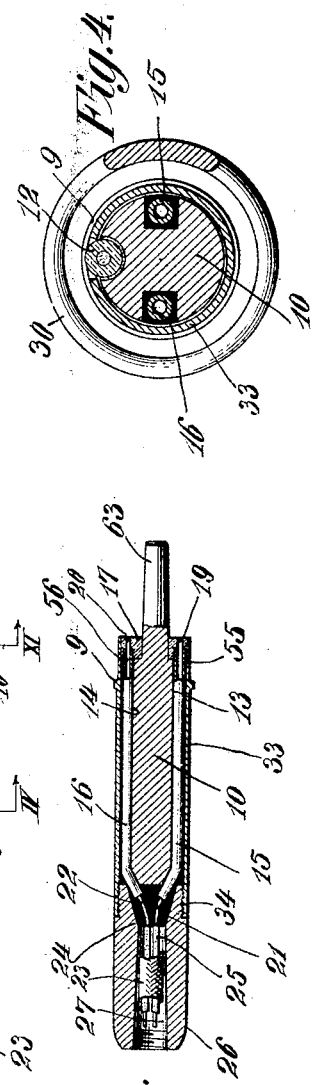

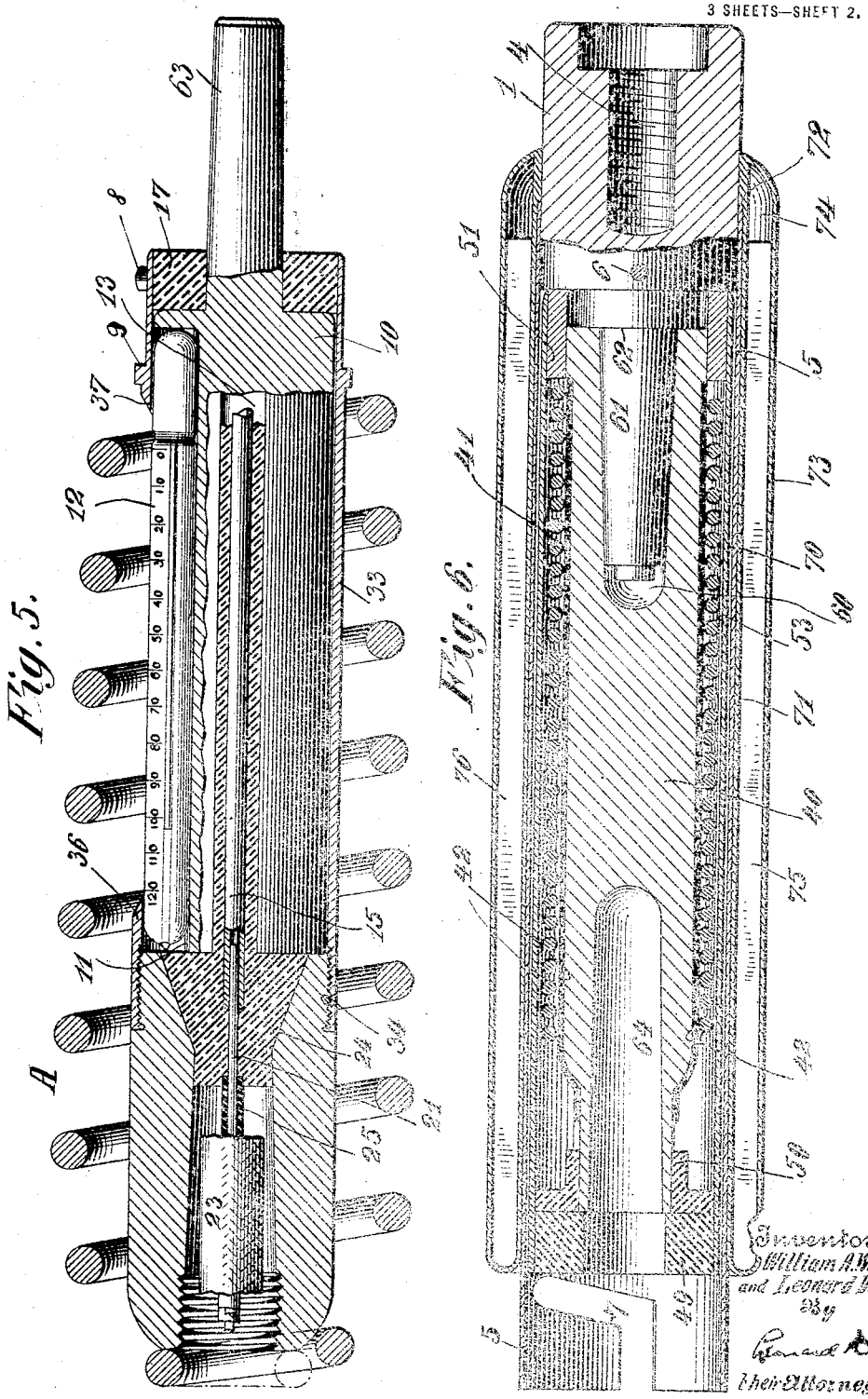

UNITED STATES PATENT OFFICE.

WILLIAM ALEXANDER WINTER, OF EAST ORANGE, AND LEONARD DAY, OF MOUNTAIN LAKES, NEW JERSEY, ASSIGNORS TO THE KNY-SCHEERER CORPORATION, A CORPORATION OF NEW YORK.

STERILIZABLE CAUTERY.

1,366,231.

Specification of Letters Patent. Patented Jan. 18, 1921.

Application filed September 8, 1917. Serial No. 190,300.

*To all whom it may concern:*

Be it known that we, WILLIAM A. WINTER and LEONARD DAY, both citizens of the United States, the former a resident of East Orange, Essex county, State of New Jersey, the latter a resident of Mountain Lakes, Morris county, State of New Jersey, have invented certain new and useful Improvements in Sterilizable Cauteries, set forth in the following specification.

This invention relates primarily to surgical instruments such as electric cauteries, technically known as "cold cauteries" in that the temperatures employed are below flesh-searing temperature, but in its broad aspect and as to many individual features the invention relates generically to implements operating through the medium of heat, including cauteries, soldering irons, branding irons and many other heaters, especially those in which a controlled degree of heat for an operating part is desirable.

One object of the invention is to improve in general the structural features of an electric heater. Another object of the invention is to render possible the indication, at an accessible locality, of the temperature of an inaccessible operating portion of the implement without physically extending the temperature indicator into the locality of the operating portion. Another object of the invention is to modify, in an improved manner, the temperature of various exposed portions of a cautery. Another object of the invention is to separate the heater unit from the other functioning parts of the apparatus so that instantaneous removal and replacement of the heater unit may be possible, particularly so that all flesh contacting parts of the cautery may be sterilized, as by boiling in water, without injuring the removable heater unit. Another object of the invention is to provide a hermetically sealed inclosure for protecting the heater unit. The more detailed objects of improvement, as well as the foregoing, will be better understood by reference to the accompanying claims, which are directed merely for purposes of illustration to the illustrative embodiment of the invention set forth in the following specification and shown in the accompanying drawings, which form a part hereof, in which like characters designate corresponding parts in the several figures, and in which Figure 1 is a plan view of a complete structure, with parts broken away, and shown in horizontal section; Fig. 2 is a front elevation of the invention with parts broken away, and shown in vertical section along line II—II of Fig. 1; Fig 3 is a horizontal section corresponding to the plane indicated by the line III—III of Fig. 2, taken through the central portion of the handle and showing particularly the lead in conductors; Fig. 4 is a cross section drawn to an enlarged scale taken through the plane of line IV—IV of Fig. 2; Fig. 5 is a longitudinal vertical section, drawn to an enlarged scale, of the handle portion of the apparatus, with parts shown in elevation; Fig. 6 is a view corresponding to Fig. 5, but showing the heater and operating end portion of the apparatus; Fig. 7 is a plan view of the heater unit, with parts broken away; Fig. 8 is a horizontal section through the heater unit; Fig. 9 is an enlarged cross section taken through the plane of line IX—IX of Fig. 8; Fig. 10 is a view corresponding to Fig. 9, taken through line X—X of Fig. 8; Fig. 11 is a cross section, drawn to an enlarged scale, through the plane of line XI—XI of Fig. 2; Fig. 12 is a central cross section through the central portion of the water jacket; and Fig. 13 is a fragmentary detail view of the joint construction between the handle and the forward parts.

The exposed operating portion of the implement in this embodiment is shown comprising a socket 1, preferably of heat conducting metal such as copper, and an operating tip 2, which may be of any desired configuration, any number of tips being capable of interchangeable use through the medium of the threaded stem 3 and threaded seat 4, which embody a satisfactory heat conducting connection. Although the threaded seat is shown formed in the socket 1 and the stem 3, as a part of the tip 2, it is of course to be understood that the reverse location is contemplated. Rearwardly extending from the socket 1 is a tubular shell 5, preferably of the same or substantially the same coefficient of expansion as the socket 1, and mechanically secured thereto and preferably hermetically sealed thereto. This tubular casing may have its embodiment in a brass tube secured about the socket 1 as by a rivet 6 or brazing or, in fact, any suitable manner. The rear portion of this tubular casing is provided with the slotted portions 7 of a bayonet joint to coöperate with the pin portions 8, fixed to the handle A, so that each end of the casing 5 may be forced snugly against the shoulder 9 of the handle A to insure a firm and rigid connection between the casing and the handle, the degree of which may be adjusted by forcing the pins 8 along the cam walls of the slot 7, which are preferably of such an extent as not to limit the relative movement of the pins 8.

The handle A comprises a heat conducting member 10 having a channel 11 adapted to receive a temperature indicator, preferably in the form of a thermometer 12. The heat conducting member 10 also preferably has two other longitudinal channels 13 and 14 to permit the passage of portions of the lead in conductors, namely, the brass tubes 15 and 16, which are insulated from the member 10 in any suitable manner, as by a packing of mica or asbestos. Toward the forward portion of the handle there is provided an insulating bushing 17, preferably of lava, providing seats for the forward ends of the brass tubes 15 and 16, which extend forward in the socket openings 19 and 20. The brass tubes, at their rear ends, are adapted to receive the terminals 21, 22 of the flexible supply cord 23, and the electrical connection may be effected by soldering, while insulation may be completed about the bare terminals 21 and 22 through the medium of a packing of mica or asbestos 24, which should extend up to and preferably about the insulating material 25 of the cord 23. The cord 23 enters the handle through the rear portion 26 having a central opening 27, tapped at the rear for the reception of the threaded nipple 28, which forms the mounting for the flexible spring wire protector 29, through which the cord 23 enters. The nipple 28 also serves to anchor the spiral spring wire heat-proof hand-holder 30 by direct engagement with its circular rear convolution 31, the forward convolution 32 of which is wrapped closely about the tubular sleeve 33, which incloses the heat conducting member 10 and which has threaded engagement at the joint 34 with the rear portion 26. It is this sleeve 33 which provides the abutment shoulder 9 and which is anchored at the forward portion to the lava bushing 17 in a suitable manner, as by the pins 8 of the bayonet joint. This sleeve 33 forms an outer closure for the channels 13 and 14, carrying forward the lead in conductors 15 and 16. It is preferably longitudinally cut-away to form the side slot 35 giving visible access through the convolutions of the hand-holder 30 to the thermometer 12, which is held in the longitudinal channel 11 by the lips 36 and 37.

The heater unit B is a complete, separate and detachable structure by itself and comprises a core 40 of heat conducting metal such as copper, about which a suitable number of heat coils 41 may be arranged in any suitable number of layers according to good practice in heater units, the various turns being insulated one from the other and from the cord 9 in any suitable manner, as by mica or vitreous insulation 42. The terminals 43 and 44 of the heating coils 41 are permanently connected in a suitable manner to the connector plugs 45 and 46, as through the medium of the sleeves 47 and 48 having a permanent mounting in the lava bushings 49 and 50. The forward end of the core 40 is threaded with a flange 51 of heat conducting metal which, if desired but not of necessity, may be a separate part from the core 40, it being shown secured thereto by set screws 52. About this flange 51 and the bushing 49 a tubular protecting covering 53 is secured to inclose the heating coils.

The plugs 45 and 46 and the forward ends 55 and 56 of the brass tubes 15 and 16 form two pairs of plug and socket electrical connectors of which, in the embodiment shown, the female elements of each pair are fixed in the handle portion A, while both the male elements are fixed to the heater unit B. It is, however, to be understood of course that all that is necessary is that one element of each of two pairs of plug and socket connectors or their equivalent be provided in the handle and the other elements be provided in the heater units. As an equivalent for the plug and socket connectors, any standard electrical connector designed for repeated connection and disconnection is contemplated.

To serve the object of ready disconnection and connection with the operating portion of the implement, a connector readily capable of heat conducting action between the heater unit B and the socket 1 is contemplated. In the construction shown, a tapered cavity 60 is formed in the forward end of the core 40 and a coöperating tapered plug 61 rearwardly extends centrally through the socket 1 and has a shoulder 62 fitting into the flange 51. It is, of course, to be understood that the plug and cavity may have reverse positioning.

To provide heat connection between the heater unit B and the heat conducting member 10, a similar tapered plug 63 and coöperating tapered socket 64 are provided between the core 40 and the heat conducting member 10, the relative positioning of the cavity and the plug being immaterial, except that it is preferred that they both be centrally or axially positioned relatively to the implement. It is preferred that the outer diameter of the protecting covering 53 of the heater unit, which is preferably cylindrical, be less than the internal diameter of the casing 5, so that an intermediate heat insulating air space 70, between the heater and the casing, be provided.

A removable water jacket C comprises an inner wall 71, arranged to fit snugly about the casing 5, and has an inwardly extending flange 72 to abut against the forward edge of the casing 5 to fix the position of the water jacket. The outer wall of the water jacket is indicated by 73.

Extending longitudinally forward from the rear of the cavity between the walls 71 and 73 are two diametrically opposite partitions 75 and 76, which terminate short of the forward end of the water jacket to provide a communicating channel 74. Inlet and outlet spigots 77 and 78 provide means for connecting the water jacket to a source of water supply and discharge which, by the partitions 75 and 76 is caused to flow forward to the channel 74 and then across and rearward to the outlet, insuring a uniform distribution of cooling water throughout the jacket.

In the employment of cauteries, especially in the treatment of vaginal diseases, certain parts of the patient must be protected against heat and heretofore, in such treatment, it has been necessary to employ a water cooled speculum, which has greatly limited the size and efficiency of the cautery which could be employed, whereas the water jacket of the present invention, coupled with the heat insulation between the heater unit and the lateral walls, insures that the locality of the cautery which is desired to be cool shall be cool and, at the same time, causes an efficient portion of the heat of the heater unit to be conducted to the operating portion of the implement. In the use of a cautery, accurately controlled temperature is necessary to insure efficient and non-injurious treatment. In order that an accurate control of the temperature may be had, it is likewise necessary that an accessible indication of the temperature of the operating portion of the implement be had. On account of the limit to the permissible cross-sectional dimensions of the implement and on account of the fragility of most temperature indicators it has been found disadvantageous to locate a thermometer so that its bulb is in contact with the operating part, an indication of the temperature of which is necessary. In accordance with this invention, the thermometer or other suitable heat indicator is located at a distant locality from the operating portion of the implement, but relatively to the heater unit at a locality of temperature symmetry with that portion of the operating part of the implement the temperature of which is desired to be indicated. By the expression "temperature symmetry" is contemplated that the thermometer 12 be located in a part which receives heat from the heater and which dissipates heat as by radiation in such manner that, under operating conditions at the end of any particular time interval, after the heater has been started in operation, the thermometer will truly indicate, in an indirect manner, the exact temperature of the operating portion in question. This may be effected in the manner indicated in the illustrative embodiment in which the configuration of the heat conducting member 10 and the heat conducting power of the connection 63, 64 is such that the desired temperature is present at the locality of the bulb of the thermometer 12. Another manner in which the instrument may be perfected is by constructing the same with little regard as to proportioning of the heat conducting member 10 and its connection with the heater unit, but by calibrating the scale of the thermometer 12 to accord with actual temperature taken by a second thermometer at the operating portion, the temperature of which is desired to be indicated, and arranging the parts under artificial operating conditions.

It is, of course, to be understood that in using the implement, the source of electric current supply to the conducting cord 23 may be varied, as is customary, through suitable means such as a rheostat or autotransformer.

It has been found impossible to construct a heater unit which could be hermetically sealed throughout its entire extent. This is true because of the necessity of using both metal and insulating material at the locality where the conducting wires enter the unit. Thus it is readily seen that no heater unit can safely be sterilized as by being boiled in water. On the other hand, with the present invention, a twist of the wrist releases the bayonet joint and the heater unit may be taken out and all the remaining parts of the implement may be placed in a sterilizer and sterilized in an improved surgical manner. When the heater unit is replaced within its casing, all exposed parts are completely sterile and the heater unit is inclosed to prevent any contaminating influence.

It is contemplated that when the invention is employed for industrial purposes such as soldering and branding, the temperature indicator may be omitted, which would eliminate the necessity for the heat conducting member 10 and its associated parts.

What is claimed and what is desired to be secured by United States Letters Patent is:—

1. An electric heater for implement-tips, comprising a front tip-socket of heat-conducting metal having a rearwardly engageable heat-conducting connector; a rearwardly extending tubular shell sealed to said socket; and a manually and rearwardly removable electric-heater unit to be located within said shell and having a heat-conducting connector detachably heat conductively connectible with the heat-conducting connector of said tip-socket.

2. An electric heater for implement-tips, comprising a front tip-socket of heat-conducting metal having a rearwardly engageable heat-conducting connector; a rearwardly extending tubular shell sealed to said socket; a manually and rearwardly removable electric-heater unit to be located within said shell and having a heat-conducting connector detachably heat conductively connectible with the heat-conducting connector of said tip-socket; and one element of each of two pairs of plug and socket electric connectors directly fixed to said heater-unit and connected with its electric terminals.

3. A removable electric heater unit for electric heaters comprising a core of heat-conducting metal having a heat-conducting connector at one end; a heating winding about said core; one element each of two pairs of plug and socket electric connectors directly fixed to said heater unit and connected with the terminals of said heating winding; and a tubular covering for said unit.

4. A heat-implement comprising a local source of heat; an operating portion in heat conductive relation with said source; a heat-conducting member in heat conductive relation with said source; and a temperature measurer associated with said heat-conducting member at a locality in temperature symmetry with said operating portion relatively to said source, whereby an indication of the temperature of said operating portion, when in an inaccessible locality, may be indicated at an accessible locality, without causing any portion of said temperature measuring means to bridge said source of heat.

5. A heat-implement comprising an operating tip; a local source of heat; means for heat conductively connecting said tip to said source of heat at one locality; a heat conducting member arranged to be connected with said source of heat at another locality; and a thermometer associated with said heat conducting member at a locality in temperature-symmetry with a portion of said operating tip relatively to said source of heat, whereby an indication of the temperature of said portion of said tip, when in an inaccessible locality, may be indicated at an accessible locality, without causing any portion of said temperature measuring means to bridge said source of heat.

6. An electric cautery all the body contacting parts of which are sterilizable without damage, comprising an operating portion; a tubular casing, extending rearwardly from said operating portion; a handle extending rearwardly from said casing; permanent lead-in conductors in said handle having each one element of two pairs of plug and socket connectors; and a removable heater unit arranged to fit into said casing and having at one end the remaining two elements of said two pairs of plug and socket connectors, whereby said heat unit may be removed manually for the sterilization of the parts necessary to be sterilized.

7. A cautery having an exposed operating portion; a rearwardly extending member containing an electric heater in heat conductive contact with said exposed operating portion; and a water-jacket secured about said rearwardly extending member, and leaving exposed said operative portion and itself operative to protect the living parts of the body to be operated upon when others are being treated.

8. A cautery comprising an operating head; an electric heater in the rear of said head for heating the same; a thermometer heat-conductively connected with said heater and located in the rear of said heater, the connection and calibration of said thermometer being arranged so that said thermometer indicates the temperature of said operating head without having any part extending across said heater.

In witness whereof we have signed our names to this specification, this 23rd day of August, 1917.

WILLIAM ALEXANDER WINTER.
LEONARD DAY.